(12) United States Patent
Tsukamoto et al.

(10) Patent No.: US 9,636,764 B2
(45) Date of Patent: May 2, 2017

(54) WIRE ELECTRICAL DISCHARGE MACHINING APPARATUS, WIRE ELECTRICAL DISCHARGE MACHINING METHOD, AND WORK

(71) Applicant: CANON MARKETING JAPAN KABUSHIKI KAISHA, Minato-ku, Tokyo (JP)

(72) Inventors: Suguru Tsukamoto, Tokyo (JP); Hisao Okazaki, Kawasaki (JP)

(73) Assignee: CANON MARKETING JAPAN KABUSHIKI KAISHA, Tokyo (JP)

( * ) Notice: Subject to any disclaimer, the term of this patent is extended or adjusted under 35 U.S.C. 154(b) by 562 days.

(21) Appl. No.: 13/921,468

(22) Filed: Jun. 19, 2013

(65) Prior Publication Data

US 2013/0341305 A1 Dec. 26, 2013

(30) Foreign Application Priority Data

Jun. 20, 2012 (JP) ................................ 2012-138881

(51) Int. Cl.
| | | |
|---|---|---|
| B23H 7/00 | (2006.01) | |
| B23H 7/36 | (2006.01) | |
| B23H 7/10 | (2006.01) | |
| B23H 7/08 | (2006.01) | |
| B23H 1/02 | (2006.01) | |

(52) U.S. Cl.
CPC ............. *B23H 7/36* (2013.01); *B23H 7/101* (2013.01); *B23H 1/028* (2013.01); *B23H 7/08* (2013.01)

(58) Field of Classification Search
CPC .......... B23H 1/028; B23H 7/08; B23H 7/101; B23H 7/36; B23H 7/10

USPC ...... 219/69.1, 69.11, 69.12, 69.14; 226/97.1, 226/94.4

See application file for complete search history.

(56) References Cited

U.S. PATENT DOCUMENTS 4,473,733 A * 9/1984 Inoue ..................... B23H 7/101
219/69.12
4,508,950 A * 4/1985 Inoue ...................... B23H 1/08
219/69.14

(Continued)

FOREIGN PATENT DOCUMENTS

| CN | 101670472 A | 3/2010 |
|---|---|---|
| JP | H10-58237 A | 3/1998 |

(Continued)

*Primary Examiner* — Quang D Thanh
*Assistant Examiner* — Joseph Iskra
(74) *Attorney, Agent, or Firm* — Canon USA, Inc. IP Division

(57) ABSTRACT

A mechanism in a wire electrical discharge machining apparatus for machining a workpiece by electrical discharge between a wire and the workpiece is disclosed. The mechanism includes a processing fluid bath configured to store processing fluid used for electrical discharge machining between the workpiece and the wire, a processing fluid supply port to communicate with the processing fluid bath and supply the processing fluid into the processing fluid bath from a processing fluid supply apparatus supplying the processing fluid, and a stream control mechanism to suppress a stream of the processing fluid supplied from the processing fluid supply port into the processing fluid bath in the direction of the water surface of the processing fluid in the processing fluid bath.

14 Claims, 10 Drawing Sheets

(56) References Cited

U.S. PATENT DOCUMENTS

| | | | | |
|---|---|---|---|---|
| 4,647,747 A * | 3/1987 | Goto | ................... | B23H 11/00 |
| | | | | 204/206 |
| 4,675,492 A * | 6/1987 | Yokomichi | ............ | B23H 7/101 |
| | | | | 219/69.1 |
| 4,778,973 A * | 10/1988 | Derighetti | ............... | B23H 7/105 |
| | | | | 204/206 |
| 6,294,749 B1 * | 9/2001 | Moro | ................... | B23H 7/101 |
| | | | | 219/69.12 |
| 2012/0217224 A1 * | 8/2012 | Miyake | ................. | B23H 1/028 |
| | | | | 219/69.12 |

FOREIGN PATENT DOCUMENTS

| | | | |
|---|---|---|---|
| JP | 2007-54913 A | | 3/2007 |
| JP | 2007054913 | * | 3/2007 |
| JP | 2008-80417 A | | 4/2008 |
| JP | 2008-87078 A | | 4/2008 |
| JP | 2008087078 | * | 4/2008 |
| JP | 2010-260151 A | | 11/2010 |
| JP | 2010260151 | * | 11/2010 |
| JP | WO2011/036924 T2 | | 3/2011 |

* cited by examiner

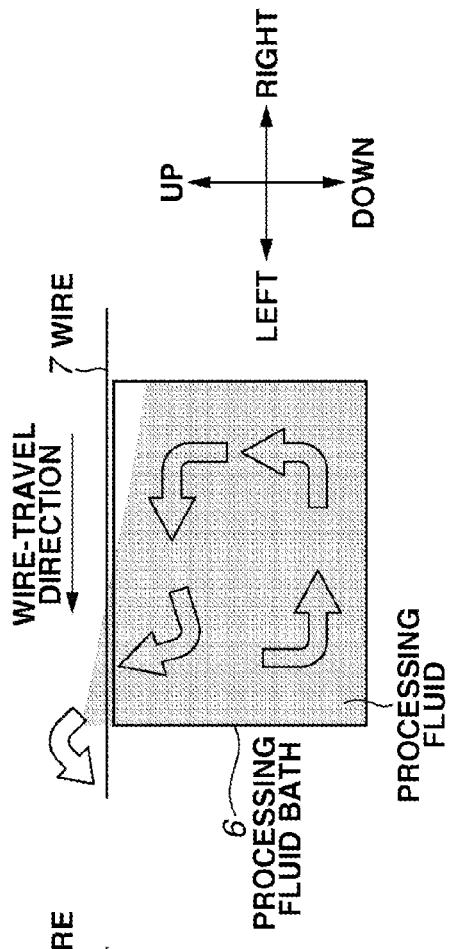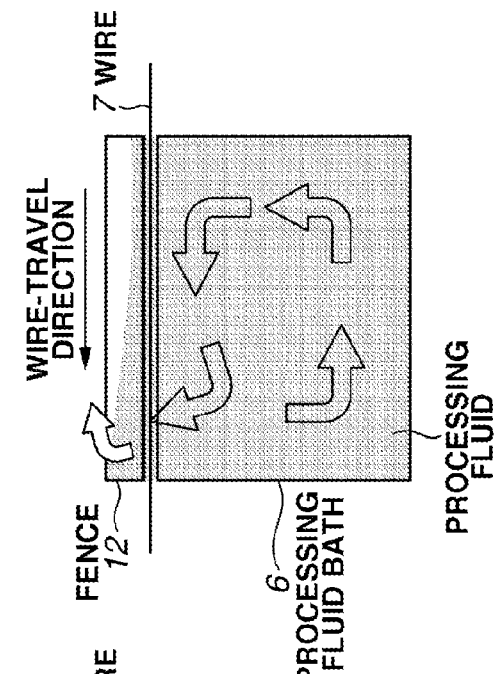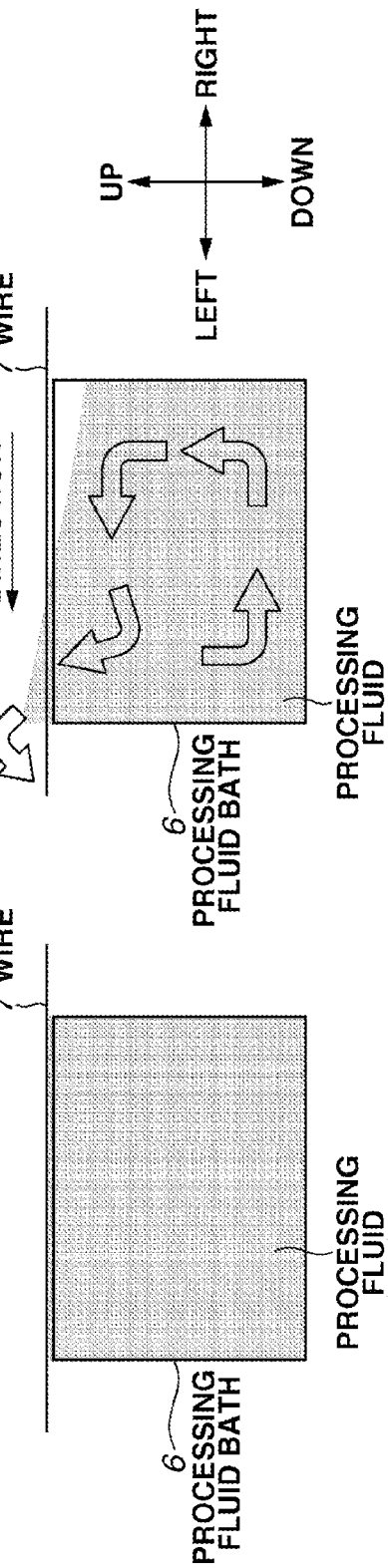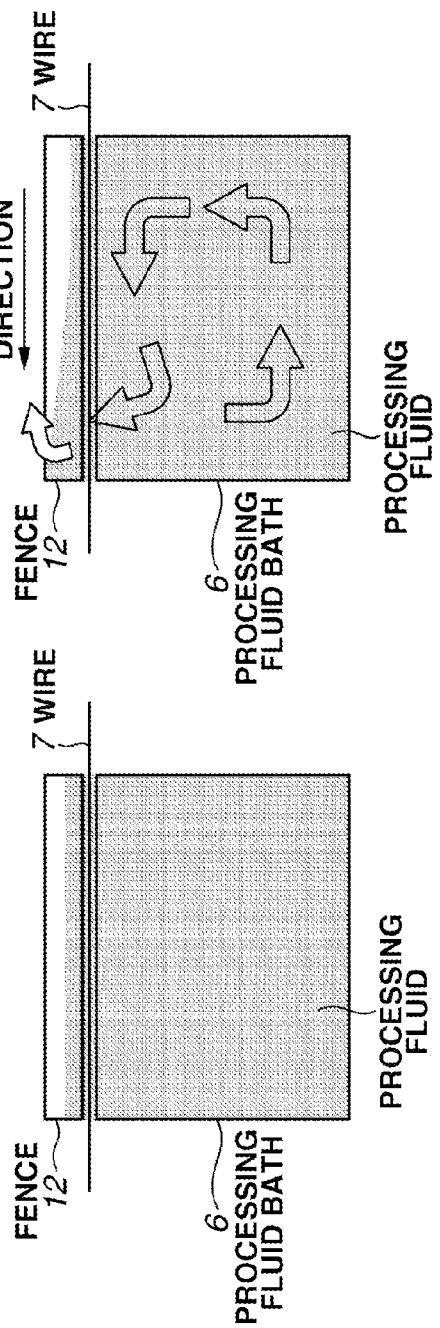

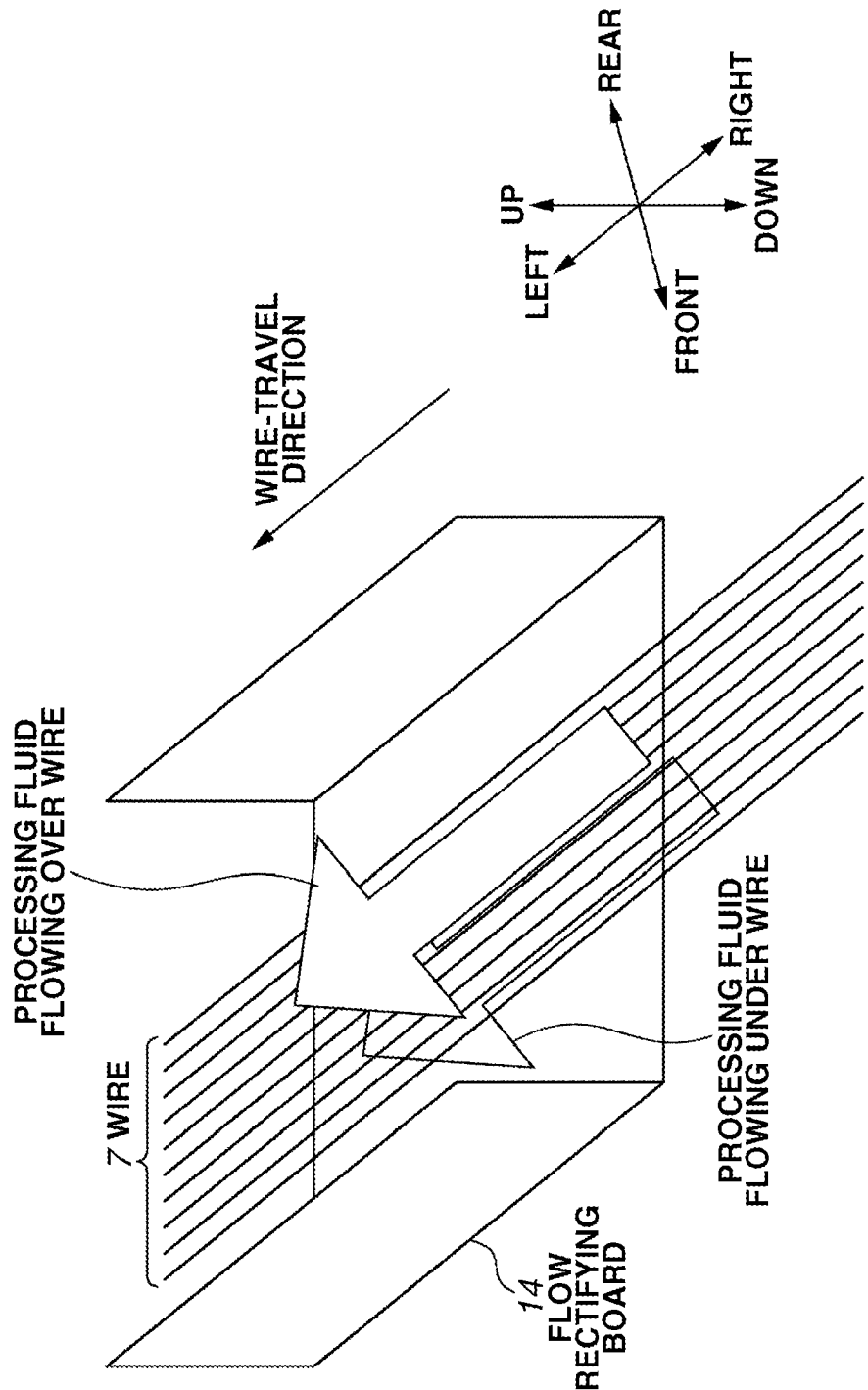

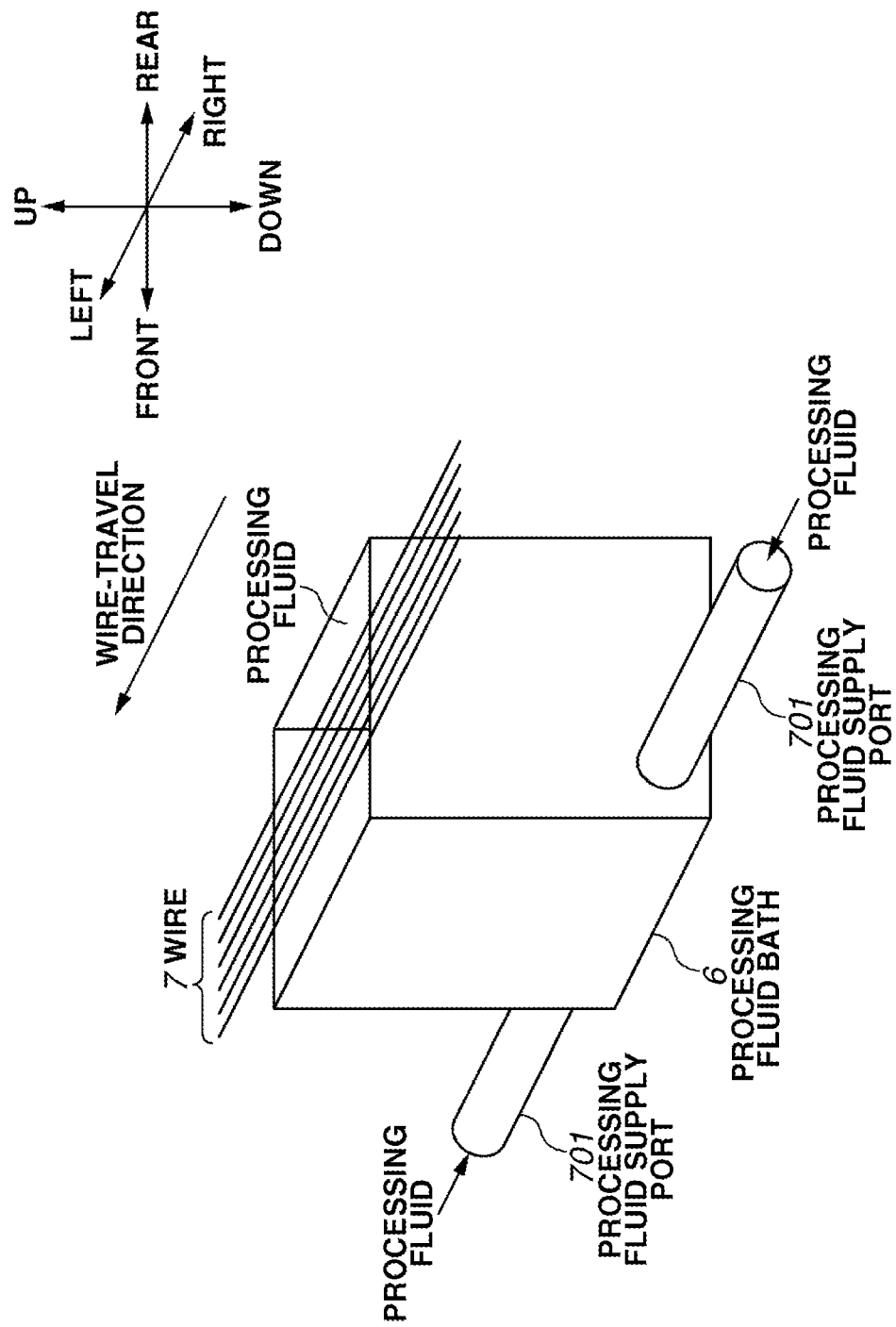

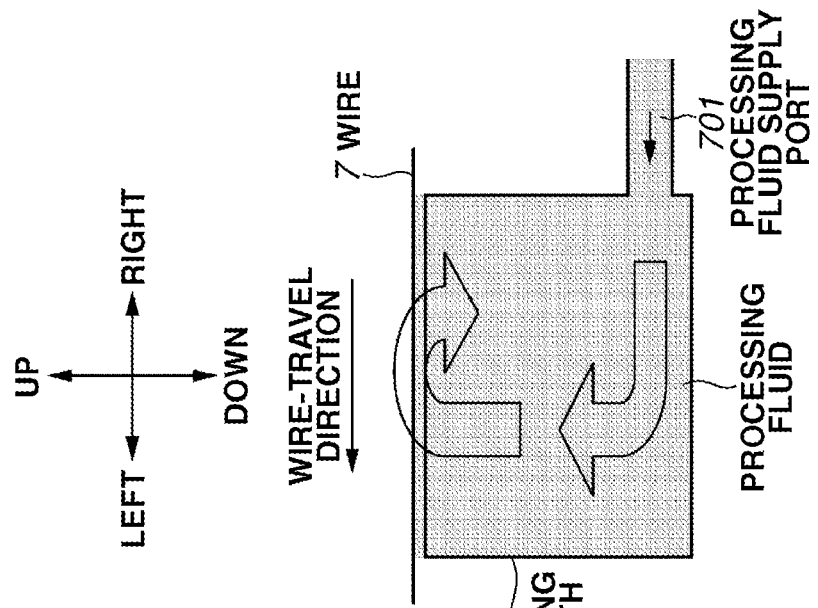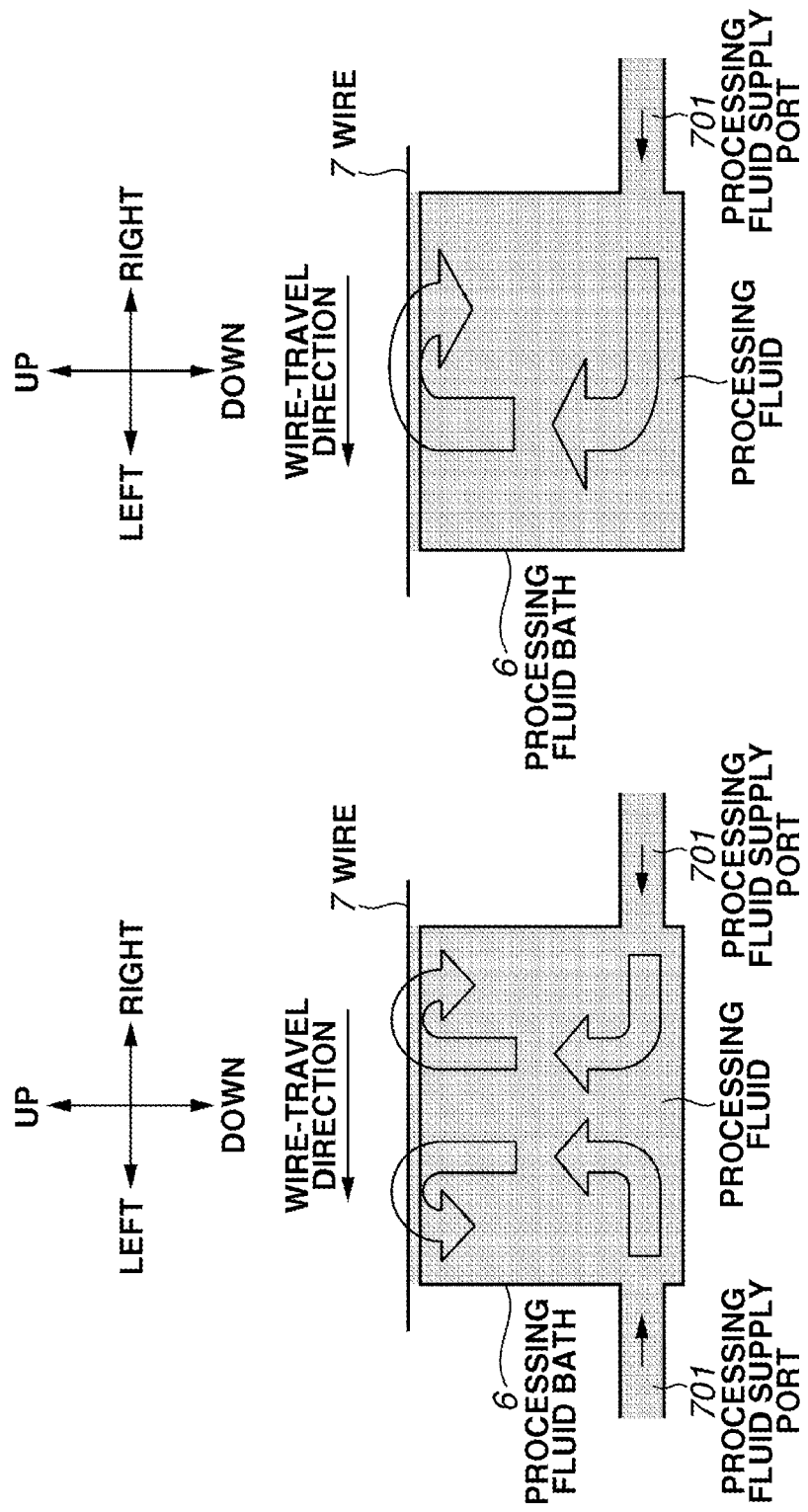

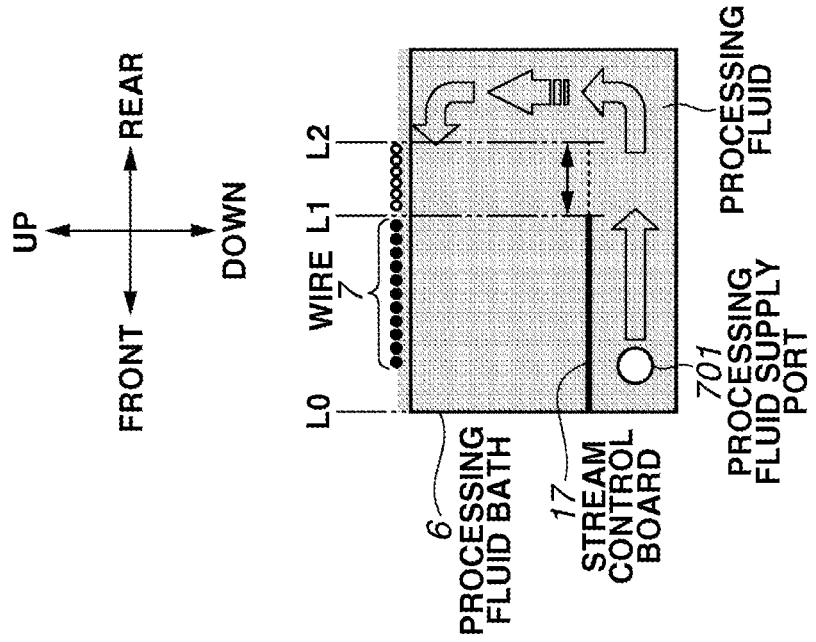
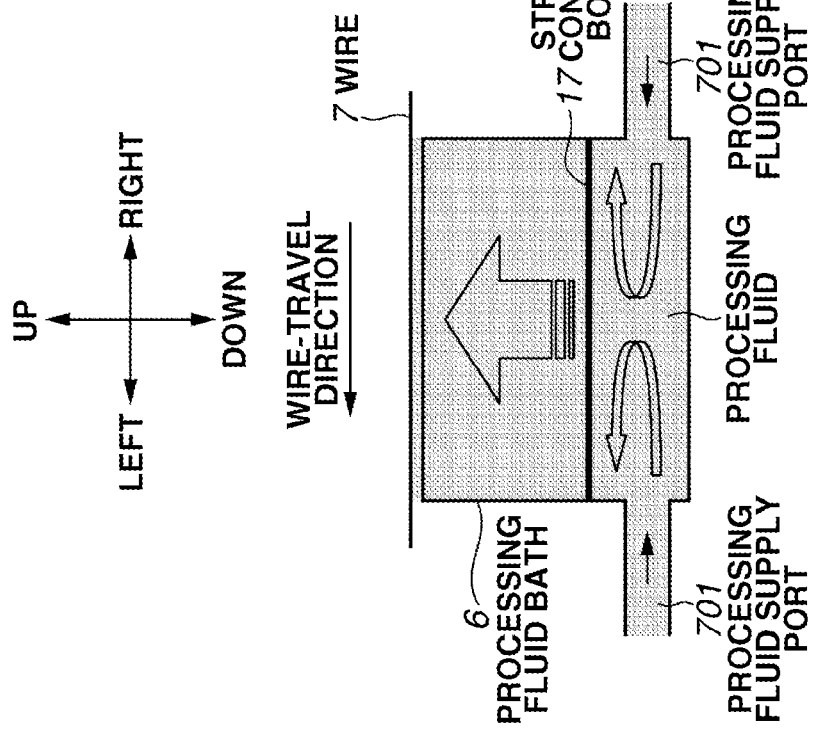

ARROW IN PROCESSING FLUID BATH 6 ILLUSTRATED IN FIG. 10 INDICATES WAVY LINES AND FLOW OF PROCESSING FLUID IN PROCESSING FLUID BATH 6 PRODUCED BY SUPPLYING PROCESSING FLUID. LENGTH OF ARROW INDICATES STRENGTH OF STREAM OF PROCESSING FLUID FLOWING FROM FLOW RATE DISPERSION CONTROL MECHANISM ACCORDING TO LENGTH THEREOF.

WIRE ELECTRICAL DISCHARGE MACHINING APPARATUS, WIRE ELECTRICAL DISCHARGE MACHINING METHOD, AND WORK

BACKGROUND OF THE INVENTION

Field of the Invention

The present disclosure relates to a wire electrical discharge machining apparatus, a wire electrical discharge machining method, and a work and a technique for decreasing the vibration of a wire due to jet flow of processing fluid supplied from a dielectric fluid supply port in a processing fluid bath to appropriately machine a workpiece by electrical discharge.

Description of the Related Art

In recent years, a method for cutting workpiece materials such as a semiconductor material, a solar cell material, and a hard material into a plurality of pieces in a short time and at the same time by the electrical discharge machining has been developed.

For example, the wire electrical discharge machining apparatus machines the workpiece material by electrical discharge such that a wire to which voltage is applied via a power feed contact is allowed to travel and the workpiece material is made close to the wire to cause an electrical discharge phenomenon, thereby slicing the workpiece material into wafers.

Japanese Patent Application Laid-Open No. 2010-260151 discusses a technique that a workpiece material is machined by electrical discharge using a plurality of travelling wires to slice the workpiece material into thin leaves.

Until now, however, as the speed of a traveling wire increases, as the number of wire electrodes increases, or as the distance between wires is decreased, for example, the traveling wire carries more processing fluid in a processing fluid bath outside the processing fluid bath, which sometimes cannot ensure a sufficient amount of the processing fluid required for wire electrical discharge machining in the processing fluid bath.

For this reason, if a sufficient amount of the processing fluid required for wire electrical discharge machining is not ensured between the workpiece (work) and a wire, which is an electrical discharge portion, atmospheric discharge, for example, occurs to break down the work being the workpiece and the wire, thereby the workpiece may not be able to be appropriately machined by the electrical discharge.

Stream of the processing fluid large in flow rate supplied to the dielectric fluid bath directly hits the wire to fluctuate the distance between wires (to vibrate the wires), whereby the workpiece may not be able to be appropriately machined by the electrical discharge. In other words, the wires are vibrated by the jet flow of the processing fluid supplied to the processing fluid bath to make it difficult to uniformly machine the workpiece.

SUMMARY OF THE INVENTION

The present application is directed to providing a mechanism for decreasing the vibration of a wire due to jet flow of processing fluid supplied from a processing fluid supply port in a processing fluid bath and for appropriately machining a workpiece by electrical discharge.

According to an aspect of the present disclosure, a wire electrical discharge machining apparatus for machining a workpiece by electrical discharge between a wire and the workpiece includes a processing fluid bath configured to store dielectric fluid used for electrical discharge machining between the work-piece and the wire, a processing fluid supply port configured to communicate with the dielectric fluid bath and to supply the dielectric fluid into the dielectric fluid bath from a dielectric fluid supply apparatus supplying the dielectric fluid, and a stream control mechanism configured to be provided to suppress a stream of the dielectric fluid supplied from the dielectric fluid supply port into the dielectric fluid bath in the direction of the water surface of the dielectric fluid in the dielectric fluid bath, in which the stream control mechanism is provided at an upper portion in the vertical direction of the processing fluid supply port between the wire and the processing fluid supply port.

According to another aspect of the present disclosure, a wire electrical discharge machining method using a wire electrical discharge machining apparatus for machining a workpiece by electrical discharge between a wire and the workpiece including storing processing fluid used for electrical discharge machining between the work-piece and the wire in a dielectric fluid bath, supplying the processing fluid into the processing fluid bath from a processing fluid supply apparatus supplying the processing fluid by a processing fluid supply port communicating with the processing fluid bath, and suppressing a stream of the processing fluid supplied from the dielectric fluid supply port into the processing fluid bath in the direction of the water surface of the dielectric fluid in the dielectric fluid bath by a stream control mechanism provided at an upper portion in the vertical direction of the processing fluid supply port between the wire and the processing fluid supply port.

The present disclosure characterizes a work in which the workpiece is machined by the wire electrical discharge machining method.

Further features and aspects of the present invention will become apparent from the following detailed description of exemplary embodiments with reference to the attached drawings.

BRIEF DESCRIPTION OF THE DRAWINGS

FIGS. 4A, 4B, 4C, and 4D illustrate that the amount of the processing fluid required for the electrical discharge machining is stored in the fence included in the multi-wire electrical discharge machining apparatus.

FIG. 6 illustrates the configuration of the flow rectifying board and the wire which are included in the multi-wire electrical discharge machining apparatus.

FIG. 7 illustrates a processing fluid supply port which supplies the processing fluid to the processing fluid bath included in the multi-wire electrical discharge machining apparatus.

FIGS. 8A and 8B are schematic diagrams illustrating that the processing fluid is supplied to the processing fluid bath without the stream control board from the processing fluid supply port and how the processing fluid flows in the dielectric fluid bath owing to the supply of the processing fluid.

FIGS. 9A and 9B illustrate that the processing fluid is supplied to the processing fluid bath equipped with the stream control board from the processing fluid supply port and how the processing fluid flows in the processing fluid bath owing to the supply of the processing fluid.

DESCRIPTION OF THE EMBODIMENTS

Figure 1:
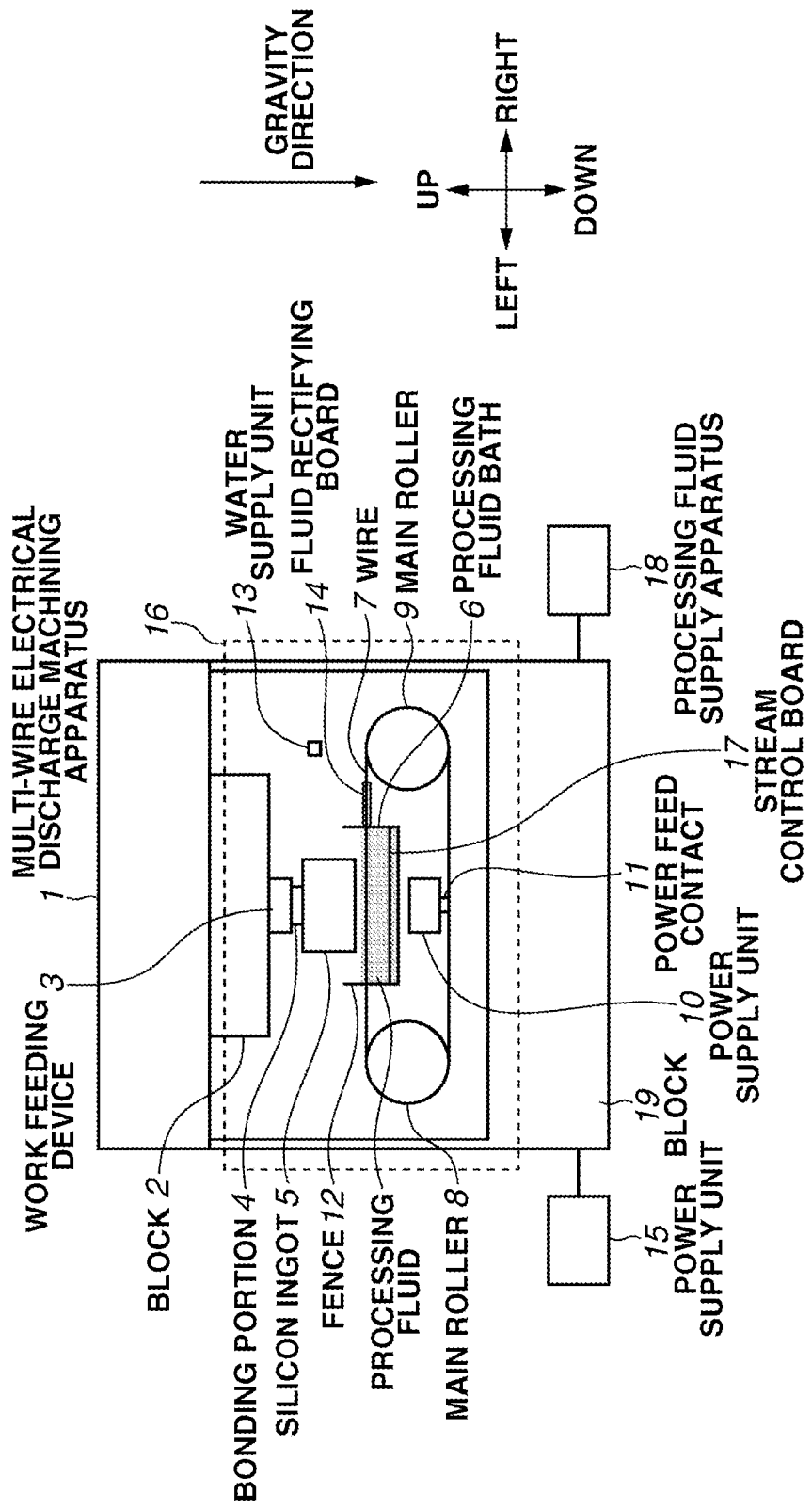
FIG. 1 is an external front view of a multi-wire electrical discharge machining apparatus.

FIG. 1 is an external front view of a multi-wire electrical discharge machining apparatus 1 according to an exemplary embodiment of the present disclosure. The configuration of each mechanism illustrated in FIG. 1 is an example. It is to be understood that mechanisms may be variously configured according to purposes and applications.

A multi-wire electrical discharge machining system according to the exemplary embodiment of the present disclosure includes the multi-wire electrical discharge machining apparatus 1, a power supply unit (a power supply device) 15, and a processing fluid supply apparatus 18.

The multi-wire electrical discharge machining system is capable of slicing a workpiece (a silicon ingot 5 in the example in FIG. 1) into a wafer at intervals of a plurality of wires 7 (wire electrodes) arranged side by side by electrical discharging.

The multi-wire electrical discharge machining apparatus 1 is connected to the power supply unit 15 via an electric wire (a voltage application wire) and operated by electric power supplied by the power supply unit 15.

In the multi-wire electrical discharge machining apparatus 1, a work feeding device 3 driven by a servo motor (not illustrated) moves upward and downward to be capable of moving the work (refers to a workpiece and the silicon ingot 5 in the example in FIG. 1) adhering to a work feeding device 3 by adhesive (the adhesive of a bonding portion 4) upward and downward.

The multi-wire electrical discharge machining apparatus 1 is an example of a wire electrical discharge machining apparatus of the present disclosure and machines the workpiece by an electrical discharge generated between the wire and the workpiece.

In the present exemplary embodiment of the present disclosure, the silicon ingot 5 is moved downward to cause the silicon ingot 5 to be close to the wire 7, generating the electrical discharge between the silicon ingot 5 and the wire 7 to machine the silicon ingot 5 by the electrical discharge. At this point, a space between the silicon ingot 5 and the wire 7 (a discharging gap (gap between the silicon ingot 5 and the wire 7)) is filled with processing fluid. The processing fluid has electric resistance with a predetermined range to generate the electrical discharge between the silicon ingot 5 and the wire 7, allowing the silicon ingot 5 to be machined by the electrical discharge.

The work feeding device 3 may be provided under the wire 7 and the silicon ingot 5 may be moved upward to generate the electrical discharge between the silicon ingot 5 and the wire 7.

In the present exemplary embodiment, the silicon ingot 5 is used as an example of the workpiece, however, other materials (a conductor or a semiconductor) which are not insulators such as silicon carbide (SIC) may be used.

As illustrated in FIG. 1, the multi-wire electrical discharge machining apparatus 1 includes a block 19 functioning as a platform of the multi-wire electrical discharge machining apparatus 1 and a block 2, the work feeding device 3, a bonding portion 4, the silicon ingot 5, a processing fluid bath 6, a main roller 8, the wire 7, a main roller 9, a power supply unit 10, a power feed contact 11, a fence 12, a water supply unit 13, a flow rectifying board 14, and a stream control board 17 provided above the block 19.

The power supply unit (power supply apparatus) 15 causes the block 2 to kept the electrical discharge gap at a constant gap so that an electrical discharge servo control circuit for controlling a servo motor effectively generates electrical discharge according to the state of electrical discharge, perform positioning, and advance the electrical discharge.

The processing fluid supply apparatus 18 sends the dielectric fluid required for cooling an electrical discharge machining portion and removing a machining chip (waste) to the silicon ingot 5 and the wire 7 by a pump, removes the machining chip in the dielectric fluid, controls specific resistance or electric conductivity (1 µS to 250 µS) by ion exchange resin, and controls fluid temperature (about 20° C.). Water is mainly used as the processing fluid, however, electrical discharge machining oil may be used. In the present exemplary embodiment, water is used as an example of the processing fluid, but, electrical discharge machining oil may be used.

The main rollers 8 and 9 are provided with grooves with predetermined pitches and in predetermined number to allow machining at a desired thickness. Wires which are supplied from a wire supply bobbin and the tension of which is controlled are wound on the two main rollers with the required number of turns and sent to a winding bobbin. Wire speed used is approximately 100 m/min to 900 m/min.

The main roller 9 is an example to which a guide roller according to the present disclosure is applied. The main roller 9 is rotated to allow the wire 7 wound on the main roller 9 to travel.

The two main rollers are rotated together in the same direction and at the same speed to allow a single wire 7 supplied from a wire feeding portion to round the periphery of the two main rollers, and allow a plurality of wires 7 arranged side by side to travel in the same direction.

The wire 7 being a single continuous one is fed from a bobbin (not illustrated), spirally wound on the outside of the main rollers with a multiple number of turns (about 2000 turns at maximum) while being fitted into a guide groove (not illustrated) on the peripheral surface of the main rollers 8 and 9, and then reeled up by a bobbin (not illustrated).

The processing fluid bath 6 supplies ion exchange water, as the processing fluid, managed to a specific resistance (an electric conductivity) with a predetermined range to the position of an electrical discharge gap (an electrical discharge point) where the wire 7 arranged side by side (also referred to as wire electrodes) and the silicon ingot 5 are close to each other.

The processing fluid bath 6 is an example to which the dielectric fluid bath according to the present disclosure is applied and stores the processing fluid used for discharge machining performed between the workpiece and the wire.

Cooling water sprayed from the water supply unit 13 is almost equal in specific resistance to the ion exchange water (the processing fluid). The specific resistance of the cooling water is also managed by ion exchange resin as is the case with the processing fluid. This is because electrical discharge is not affected if the cooling water is mixed with the processing fluid.

The cooling water sprayed from the water supply unit 13 is the processing fluid for cooling the main rollers 8 and 9 and the wire 7.

The processing fluid sprayed from the water supply unit 13 is equal or almost equal in specific resistance to the processing fluid stored in the processing fluid bath 6.

The flow rectifying board 14 is a mechanism for pouring the processing fluid sprayed from the water supply unit 13 into the processing fluid bath 6 by the traveling wire 7. The configuration of the rectifying board 14 is described in detail below.

The fence 12 is provided above the processing fluid bath 6 and the wire 7, and encompassing the work so that the interface (liquid level) of the processing fluid flowing into the processing fluid bath 6 becomes higher than the wire 7. Using the fence 12 allows the water level of the processing fluid to be higher than the wire 7.

The fence 12 is an example to which an outflow inhibition board according to the present disclosure is applied. The fence 12 is provided above the processing fluid bath 6 to inhibit the processing fluid stored in the processing fluid bath 6 from outflowing from the processing fluid bath 6. The traveling wire is provided in the gap between the outflow inhibition board and the processing fluid bath 6.

Figure 3:
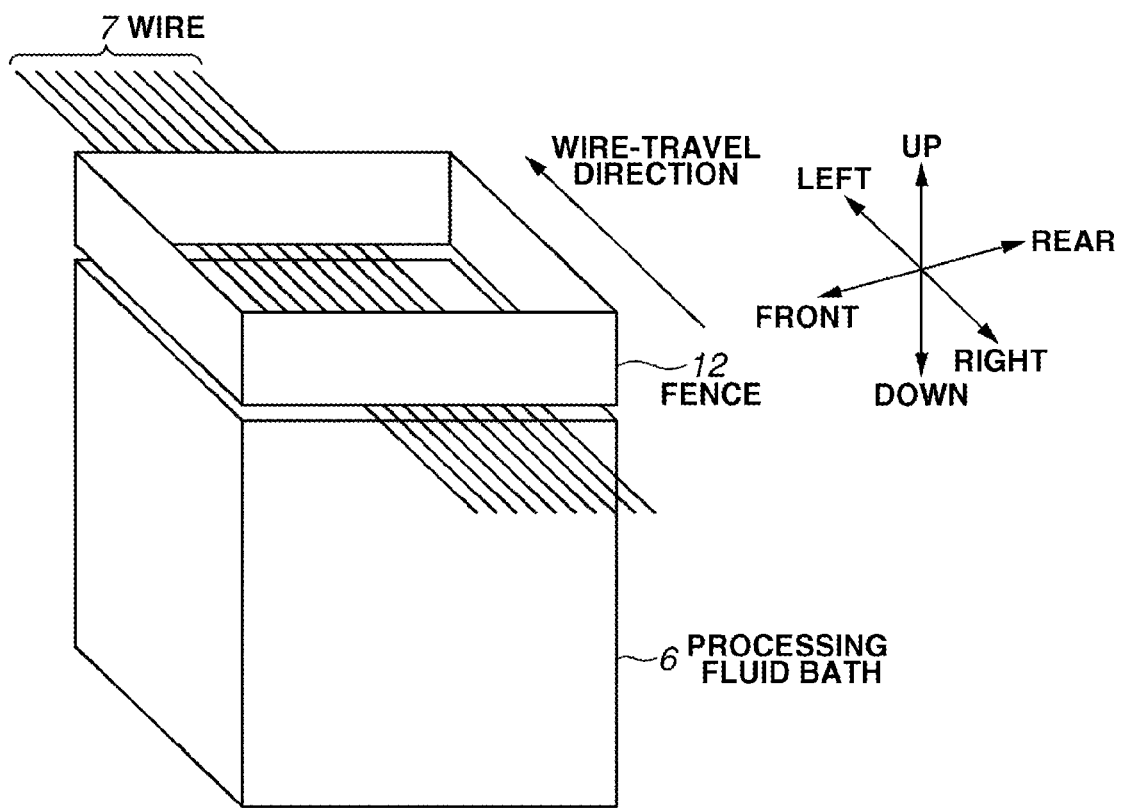
FIG. 3 illustrates a configuration of a processing fluid bath, a fence, and a wire which are included in a multi-wire electrical discharge machining apparatus.

The fence 12 illustrated in FIG. 3 is provided over the edge of the processing fluid bath 6, however, the fence 12 may be provided inside or outside the processing fluid bath 6 instead of immediately above the edge of the processing fluid bath 6.

The outflow inhibition board illustrated in FIG. 3 is configured to encompass the processing fluid in the processing fluid bath 6. The outflow inhibition board is at least provided on the side of the wire traveling direction with respect to the workpiece to convey the processing fluid in the processing fluid bath 6 in the direction in which the wires travel and to prevent the processing fluid in the processing fluid bath 6 from being conveyed outside the processing fluid bath 6, allowing ensuring the amount of the processing fluid required for the electrical discharge machining at the gap (an electrical discharge gap) between the work and the wire.

The outflow inhibition board is provided above the edge of the processing fluid bath 6 on the side of the wire traveling direction with respect to the workpiece.

A stream control board 17 for controlling the stream of the processing fluid is provided inside the processing fluid bath 6.

A processing fluid supply unit (a processing fluid supply port 701 is also referred to as the processing fluid supply unit) provided under the processing fluid bath 6 supplies the processing fluid to the processing fluid bath 6. For this reason, the processing fluid supplied from the processing fluid supply unit directly hits the wire 7 from the lower part and the stream of the processing fluid fluctuates the distance of the wires (vibrates the wires), which may make it difficult to uniformly machine the workpiece.

For this reason, as described below with reference to FIGS. 9A and 9B, the stream control board 17 which prevents the processing fluid supplied from the processing fluid supply unit from directly hitting the wire 7 from the lower part of the wire 7 is provided inside the processing fluid bath 6.

The stream control board 17 is described in detail below with reference to FIGS. 9A and 9B.

Figure 2:
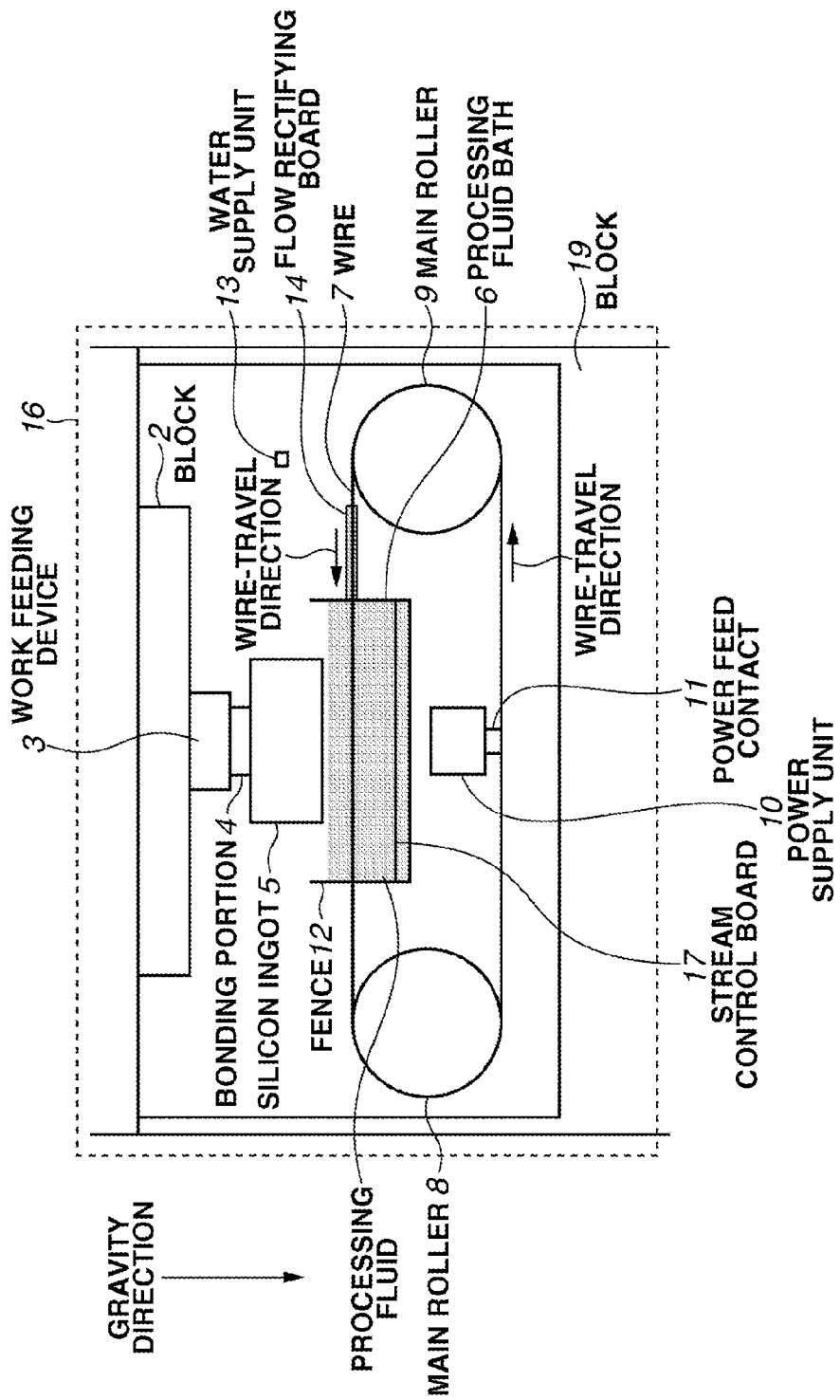
FIG. 2 is an enlarged view of a dotted line frame illustrated in FIG. 1.

FIG. 2 is described below.

FIG. 2 is an enlarged view of a frame 16 indicated by a dotted line illustrated in FIG. 1.

The block 2 is bonded to the work feeding device 3. The work feeding device 3 adheres (is bonded) to the silicon ingot (a work) 5 by the bonding portion 4.

In the present exemplary embodiment, the silicon ingot 5 is cited as an example of a workpiece material (a work).

Any material may be used for the bonding portion 4 provided that the bonding portion 4 is used for allowing the work feeding device 3 to adhere (be bonded) to the silicon ingot 5 (the work). For example, a conductive adhesive is used.

The work feeding device 3 is the one that is equipped with a mechanism for moving the silicon ingot 5 adhering (bonded) by the bonding portion 4 upward and downward. The work feeding device 3 moves downward to allow the silicon ingot 5 to approach the wire 7.

The processing fluid bath 6 is a container for storing the processing fluid. The processing fluid is deionized water high in resistance, for example. The processing fluid is provided between the wire 7 and the silicon ingot 5 to generate the electrical discharge between the wire 7 and the silicon ingot 5, allowing the silicon ingot 5 to be cut.

As described in FIG. 1, the multi-wire electrical discharge machining apparatus 1 is equipped with the fence 12 above the processing fluid bath 6.

The fence 12 is provided to ensure the amount of the processing fluid required for electrical discharge machining between the work and the wire (the electrical discharge gap) serving as an electrical discharge generation portion.

The fence 12 is the fence of the present disclosure, provided above the processing fluid bath 6, stores the processing fluid so that the water level of the processing fluid stored in the processing fluid bath 6 becomes higher than the wire 7, and functions to reduce the amount of outflow of the processing fluid in the processing fluid bath 6 to the outside of the processing fluid bath 6 due to the travel of the wire.

There is a gap between the fence 12 and the processing fluid bath 6 between which the wires travel.

The fence 12 is described in detail below with reference to FIG. 3, FIGS. 4A to 4D, and FIG. 5.

As illustrated in FIG. 2, the fence 12 is provided above the processing fluid bath 6. The processing fluid is sprayed from the water supply unit 13 to the main roller 9 and/or the wire 7 between the processing fluid bath 6 and the fence 12, and the sprayed processing fluid passes through the flow rectifying board 14 and is stored in the processing fluid bath 6. Thus, the processing fluid can be stored so that the water level of the processing fluid stored in the processing fluid bath 6 becomes higher than the wire 7 and the amount of outflow of the processing fluid in the processing fluid bath 6 to the outside of the processing fluid bath 6 due to the travel of the wire can be reduced.

Thereby, the amount of the processing fluid required for electrical discharge machining can be ensured between the work and the wire (the electrical discharge gap) serving as an electrical discharge generation portion and the electrical discharge machining can be stably performed to prevent a defect from occurring in the workpiece.

As illustrated in FIG. 2, the multi-wire electrical discharge machining apparatus 1 is equipped with the flow rectifying board 14 and the water supply unit 13.

In order that the processing fluid can flow on the wires which are on top of the main roller 9 and wound on the main roller 9 and/or the wires between the main roller 9 and the processing fluid bath 6, the water supply unit 13 is arranged at the upper portion of these components.

The water supply unit 13 is an example to which the water supply mechanism according to the present disclosure is applied and sprays the processing fluid to the wires traveling between the main roller 9 and the processing fluid bath 6 and/or the main roller 9.

The water supply mechanism sprays the processing fluid to the wire 7 between the main roller 9 provided in the direction opposite to the travel direction of the wire 7 and the processing fluid bath 6 and/or the main roller 9.

The water supply mechanism is provided at the upper portion of the wire 7 between the main roller 9 provided in the direction opposite to the travel direction of the wire 7 and the processing fluid bath 6 and/or the main roller 9.

The water supply unit 13 sprays the processing fluid as cooling water to the wires which are on top of the main roller 9 and wound on the main roller 9 to protect the main roller 9 from heat generated by the wire electrode (the wire 7) in a case where the wire 7 is supplied with power.

The processing fluid as cooling water is used to ensure the amount of the processing fluid required for the electrical discharge machining at the gap between the work (the silicon ingot 5) and the wire 7. For that reason, the flow rectifying board 14 is provided to convey the processing fluid for cooling traveling on the main roller 9 to the processing fluid bath 6. This enables ensuring the amount of the processing fluid required for the electrical discharge machining from the state where the wire is still to the state where the wire travels.

If the wire travels without the water supply unit 13 spraying the processing fluid, for example, the wire traveling through the gap between the fence 12 and the processing fluid bath 6 causes a large amount of air to enter the processing fluid bath 6 and the processing fluid in the processing fluid bath 6 leaks through the gap between the fence 12 and the processing fluid bath 6 to possibly lower the water level of the processing fluid bath 6.

To solve the above problems, the multi-wire electrical discharge machining apparatus 1 is provided with the flow rectifying board 14 and the water supply unit 13.

The main rollers 8 and 9 (also referred to as guide rollers) are provided with a plurality of rows of grooves for fitting the wire 7. The wire 7 is fitted into the grooves. The main rollers 8 and 9 are rotated clockwise or counterclockwise to allow the wire 7 to travel.

The wire 7 is wound on the main rollers with a plurality of turns and aligned at a predetermined pitch according to the grooves notched in the main rollers.

The main rollers 8 and 9 use metal in their centers and the outside thereof is covered with resin.

A strong mechanical wear and conductivity are required of the power feed contact 104. Hard metal is used for the power feed contact 104.

The silicon ingot 5 is arranged over the center portion between the main rollers, fixed to the work feeding device 3, moved upward and downward by the work feeding device 3 moving upward and downward, and machined.

The processing fluid bath 6 is provided at the center portion between the main rollers. The wire 7 and the silicon ingot 5 are immersed in the processing fluid bath 6 to cool the electrical discharge machining portion and remove machining chips.

As illustrated in FIG. 2, The wire 7 is fitted into the main rollers 8 and 9 and forms a wire array on the upper and lower sides of the main rollers 8 and 9.

The wire 7 is a conductor. The power feed contact 11 of the power supply unit 10 to which the power supply unit 15 supplies voltage is in contact with the wire 7 to cause the power feed contact 11 to apply the supplied voltage to the wire 7. (The power feed contact 11 applies voltage to the wire 7.)

The electrical discharge is generated between the wire 7 and the silicon ingot 5 to allow the silicon ingot 105 to be cut (to be performed the electrical discharge machining) and to form silicon (a silicon wafer or a workpiece) in a thin sheet.

The configuration of the processing fluid bath 6, the fence 12, and the wire 7 is described below with reference to FIG. 3.

FIG. 3 illustrated a configuration of the processing fluid bath 6, the fence 12, and the wire 7 which are included in the multi-wire electrical discharge machining apparatus 1.

As illustrated in FIG. 3, there is a gap between the processing fluid bath 6 and the fence 12, between which the wire 7 travels.

The processing fluid supplied to the processing fluid bath 6 flows out through the gap. The processing fluid larger in flow rate than the processing fluid flowing out through the gap is supplied to the processing fluid bath 6.

For this reason, the processing fluid whose amount is required for the electrical discharge machining is stored also in the fence 12.

The following describes that the processing fluid whose amount is required for the electrical discharge machining is stored in the fence 12 with reference to FIGS. 4A to 4D.

FIGS. 4A to 4D describe that the amount of the processing fluid required for the electrical discharge machining is stored in the fence 12 included in the multi-wire electrical discharge machining apparatus 1.

FIG. 4A illustrates a state where the processing fluid is stored in the processing fluid bath 6 without the fence 12 and the wire 7 does not travel.

As illustrated in FIG. 4A, since the wire does not travel, the wire 7 is bought into contact with the processing fluid in the processing fluid bath 6 by the processing fluid supplied in the processing fluid bath 6.

FIG. 4B illustrates a state where the processing fluid is stored in the processing fluid bath 6 without the fence 12 and the wire 7 is traveling.

As illustrated in FIG. 4B, since the wire is traveling, the processing fluid in the processing fluid bath 6 is conveyed out in the direction in which the wire is traveling and partially brought into no contact with the wire 7. Arrows in the processing fluid bath 6 illustrated in FIG. 4B indicate the flow of the processing fluid in the processing fluid bath 6. Since the wire is traveling, the processing fluid in the processing fluid bath 6 flows as indicated by the arrows, is conveyed out in the direction in which the wire is traveling, and spilled over the processing fluid bath 6. For this reason, the processing fluid in the processing fluid bath 6 cannot even come into contact with the wire 7 and it is difficult to ensure the amount of the processing fluid required for electrical discharge machining between the work and the wire (the electrical discharge gap).

In the present exemplary embodiment, as illustrated in FIGS. 4C and 4D, the fence 12 is provided above the processing fluid bath 6 to ensure the amount of the processing fluid required for electrical discharge machining between the work and the wire (the electrical discharge gap).

FIG. 4C illustrates a state where the processing fluid is stored in the processing fluid bath 6 and the fence 12 and the wire 7 is not traveling.

FIG. 4D illustrates a state where the processing fluid is stored in the processing fluid bath 6 and the fence 12 and the wire 7 is traveling.

As illustrated in FIG. 4D, since the wire between the processing fluid bath 6 and the fence 12 is traveling, the processing fluid in the processing fluid bath 6 is conveyed out in the direction in which the wire is traveling, however, the fence 12 prevents the processing fluid conveyed out from being conveyed outside the processing fluid bath 6 and the fence 12.

This enables ensuring the amount of the processing fluid required for electrical discharge machining between the work and the wire (the electrical discharge gap).

Arrows in the processing fluid bath 6 illustrated in FIG. 4D indicate the flow of the processing fluid in the processing fluid bath 6.

If stream in the processing fluid bath 6 increases because the wire speed increases, the height of the fence 12 is increased (adjusted) to allow an outflow of the processing fluid to the processing fluid bath 6 to be decreased.

The configuration of the fence 12, the water supply unit 13, and the flow rectifying board 14 which are included in the multi-wire electrical discharge machining apparatus 1 is described below with reference to FIG. 5.

Figure 5:
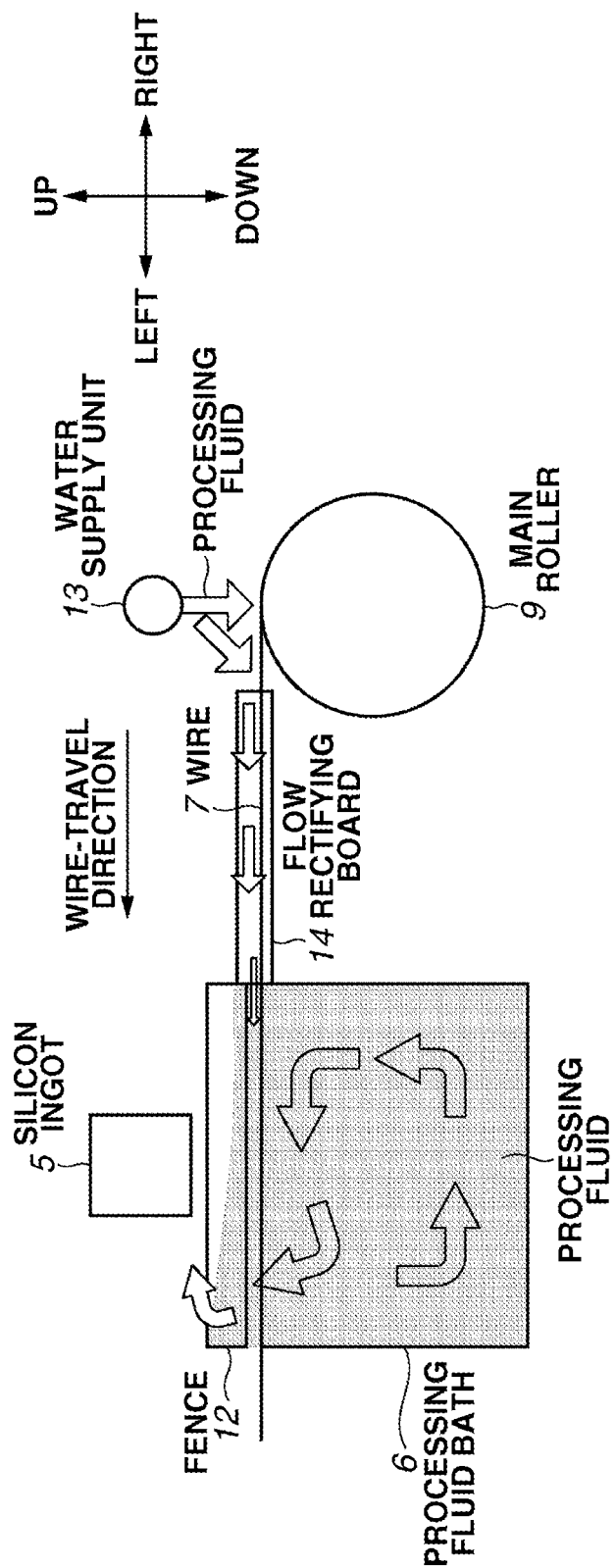
FIG. 5 illustrates the configuration of the fence, a water supply unit, and a flow rectifying board which are included in the multi-wire electrical discharge machining apparatus.

FIG. 5 illustrates the configuration of the fence 12, the water supply unit 13, and the flow rectifying board 14 which are included in the multi-wire electrical discharge machining apparatus 1.

With reference to FIG. 5, the following describes the securement of amount of the processing fluid required for electrical discharge machining in the gap between the work and the wire such that the processing fluid as cooling water sprayed from the water supply unit 13 is caused to flow into the processing fluid bath 6 and the fence 12 with the aid of the travel of the wire 7 and the flow rectifying board 14.

As described above, in FIG. 4B, the wire is traveling to cause the processing fluid in the processing fluid bath 6 to flow outside the processing fluid bath 6, which brings the wire 7 into a state where the wire 7 is not immersed in the processing fluid.

The fence 12 is provided to solve the above problem, however, air enters from the gap between the fence 12 and the processing fluid bath 6 (the gap between which the wire is traveling) or the processing fluid leaks therefrom, which may bring the wire 7 in the processing fluid bath 6 in the direction opposite to the direction in which the wire is traveling into a state where the wire 7 is not partially immersed in the processing fluid.

A mechanism for ensuring the amount of the processing fluid required for the electrical discharge machining between the work and the wire is described below with reference to FIG. 5.

As illustrated in FIG. 5, the water supply unit 13 sprays the processing fluid as cooling water to the main roller 9 to protect the main roller 9 from the heat of the wire. The water supply unit 13 can also spray the processing fluid onto the wire 7 between the main roller 9 and the processing fluid bath 6.

The water supply unit 13 sprays the processing fluid to the wire 7 being allowed to travel by the main roller 9 and the traveling wire 7 causes the sprayed processing fluid to flow through the gap between the processing fluid bath 6 and the fence 12.

As illustrated in FIG. 5, the flow rectifying board 14 is provided under the wire 7 traveling between the main roller 9 and the processing fluid bath 6 and/or the fence 12 to cause the processing fluid dropping from the wire 7 to flow through the gap between the processing fluid bath 6 and the fence 12.

Thus, the water supply unit 13 sprays the processing fluid to the traveling wire 7/the main roller 9 and the traveling wire 7 causes the processing fluid lying on the flow rectifying board 14 and the wire 7 to flow through the gap between the processing fluid bath 6 and the fence 12.

The configuration of the flow rectifying board 14 and the wire 7 which are included in the multi-wire electrical discharge machining apparatus 1 is described below with reference to FIG. 6.

FIG. 6 illustrates the configuration of the flow rectifying board 14 and the wire 7 which are included in the multi-wire electrical discharge machining apparatus 1.

As illustrated in FIG. 6, the flow rectifying board 14 is provided under the wire 7, and the bottom board (bottom surface) and the side board (side surface) of the flow rectifying board 14 store the processing fluid dropped from the wire 7, and the sprayed processing fluid can be conveyed on the upper and the lower surface of the traveling wire 7 by the travel of the wire 7 to the processing fluid bath 6 and/or the fence 12.

The flow rectifying board 14 is an example to which the rectifying board according to the present disclosure is applied and provided under the wire 7 between the main roller 9 and the processing fluid bath 6 to the processing fluid bath 6 to send out the processing fluid sprayed by the water supply mechanism.

The processing fluid conveyed to the processing fluid bath 6 and/or the fence 12 passes through the gap between the processing fluid bath 6 and the fence 12 and enters the processing fluid bath 6 and the fence 12 to allow ensuring the amount of the processing fluid required for the electrical discharge machining between the work and the wire.

This enables ensuring the amount of the processing fluid in the processing fluid bath 6 required for the electrical discharge machining from the state where the wire is still to the state where the wire is traveling.

The processing fluid supply port 701 which supplies the processing fluid to the processing fluid bath 6 included in the multi-wire electrical discharge machining apparatus 1 is described below with reference to FIG. 7.

FIG. 7 illustrates the processing fluid supply port 701 which supplies the processing fluid to the processing fluid bath 6 included in the multi-wire electrical discharge machining apparatus 1.

As illustrated in FIG. 7, the processing fluid bath 6 is provided with the processing fluid supply ports 701 on the left and the right on the front side of the lower portion of the processing fluid bath 6.

The processing fluid is supplied to the processing fluid bath 6 through each of the processing fluid supply ports 701.

The processing fluid supply port 701 may be provided at a different position such as the bottom of the processing fluid bath 6 and the number of the processing fluid supply ports 701 is not limited to two.

The processing fluid supply port 701 communicates with the processing fluid supply apparatus 18. The processing fluid is supplied from the processing fluid supply apparatus 18 to the processing fluid supply port 701 and supplied to the processing fluid bath 6 through the processing fluid supply port 701.

The processing fluid supply port 701 is an example to which the processing fluid supply port according to the present disclosure is applied, and communicates with the processing fluid bath 6 to supply the processing fluid from the processing fluid supply apparatus 18 supplying the processing fluid to the processing fluid bath 6.

FIGS. 8A and 8B are schematic diagrams illustrating that the processing fluid is supplied to the processing fluid bath 6 without the stream control board 17 from the processing fluid supply port 701 and how the processing fluid flows in the processing fluid bath 6 owing to the supply of the processing fluid.

Arrows in the processing fluid bath 6 illustrated in FIG. 8A indicate how the processing fluid flows in the processing fluid bath 6 owing to the supply of the processing fluid.

In FIG. 8A, the processing fluid is supplied from the processing fluid supply ports 701 on both sides of the processing fluid bath 6 to cause two streams to run into each other and well up toward the water surface in the form of a jet flow, due to which the jet flow directly hits a plurality of wires 7, which may disorder the distance between the wires stretched at equally spaced intervals.

FIG. 8B is a schematic diagram illustrating not a double but a single processing fluid supply port 701 is provided. Arrows in FIG. 8B indicate how the processing fluid flows in the processing fluid bath 6 owing to the supply of the processing fluid.

As illustrated in FIG. 8B, the processing fluid is supplied from the processing fluid supply port 701 on one side of the processing fluid bath 6 to cause a stream to run into the side opposite to the processing fluid supply port 701 and well up toward the water surface in the form of a jet flow, which may disorder the distance between the wires as is the case with FIG. 8A.

The following describes that the processing fluid is supplied to the processing fluid bath 6 equipped with the stream control board 17 from the processing fluid supply port 701 and how the processing fluid flows in the processing fluid bath 6 owing to the supply of the processing fluid with reference to FIGS. 9A and 9B.

FIGS. 9A and 9B illustrate that the processing fluid is supplied to the processing fluid bath 6 equipped with the stream control board 17 from the processing fluid supply port 701 and how the processing fluid flows in the processing fluid bath 6 owing to the supply of the processing fluid.

Arrows in the processing fluid bath 6 illustrated in FIGS. 9A and 9B indicate how the processing fluid flows in the processing fluid bath 6 owing to the supply of the processing fluid.

As illustrated in FIGS. 9A and 9B, the stream control board 17 is arranged in the vicinity of the bottom of the processing fluid bath 6 to isolate the processing fluid supply port 701 from a wire stretching portion, causing the stream to pass between the bottom of the processing fluid bath 6 and the stream control board 17 to reach the water surface in a state of reduced flow rate without directly welling up in the direction of the water surface where a plurality of the wires 7 are stretched, which reduces disordering the distance between the wires stretched at equally spaced intervals to allow more stable electrical discharge machining.

FIGS. 9A and 9B illustrate the same processing fluid bath 6 but are different from each other in the direction from which the processing fluid bath 6 is viewed. FIG. 9A is a diagram viewed from the front. FIG. 9B is a diagram viewed from the right.

As illustrated in FIGS. 9A and 9B, the stream control board 17 having at least a width of a plurality of the wires 7 (a distance between L0 and L1) or more is provided under the wire 7.

As illustrated in FIG. 9B, the processing fluid supplied from the processing fluid supply port 701 is caused to flow from the front to the rear direction to hit the wall surface (the rear wall surface) of the processing fluid bath 6 and rise in the direction of the water surface. The stream flows in the direction of the water surface where the wire 7 does not exist and flows into a portion where the wire 7 exists without directly colliding with the wire 7 to allow decreasing the possibility that the stream fluctuates the distance between the wires (vibrates the wires) to make it difficult to uniformly machine the workpiece.

Thus, the stream control board 17 (stream control mechanism) controls the stream of the processing fluid so that the force which the wire receives from the stream of the processing fluid supplied from the processing fluid supply port 701 (processing fluid supply mechanism) is decreased.

More specifically, the stream control board 17 (stream control mechanism) controls the stream of the processing fluid so that the force which the wire receives from the stream of the processing fluid is decreased by causing the processing fluid supplied from the processing fluid supply port 701 (the processing fluid supply mechanism) to detour the stream control board 17 (stream control mechanism).

In the stream control board 17, the dimension of its depth is adjustably configured in the range of the L1 to L2 illustrated in FIG. 9B, for example, according to the number of wires 7 to be stretched to allow preventing the jet flow welling up at the position where the wire 7 is stretched from directly hitting the wire 7, which enables decreasing the possibility that the stream fluctuates the distance between the wires (vibrates the wires) to make it difficult to uniformly machine the workpiece. As a result, a stable electrical discharge machining can be performed.

As illustrated in FIG. 9B, if the number of the wires 7 is increased to increase the width of the wires 7, i.e., the distance between L0 to L2, the length of the stream control board 17 can be adjusted to that of L0 to L2 according to the length (a mechanism (an adjustment unit) for adjusting the length by sliding the stream control board 17 is provided), so that the length of the stream control board 17 can be adjusted according to the number of the wires 7. A troublesome work for a user can be reduced, for example, such as work for replacing the stream control board 17 with the stream control board 17 of which length is adjusted according to the number of the wires 7.

In other words, the stream control board 17 is a board (the stream control mechanism) whose length can be adjusted to the length determined according to the number of wires.

Thus, the stream control board 17 includes the adjustment unit for adjusting the length of the board according to the number of wires.

As illustrated in FIG. 9B, the processing fluid supply port 701 (the processing fluid supply mechanism), the stream control board 17 (the stream control mechanism), and arrangement position where the wires travel are in a position in the same direction in the processing fluid bath 6. In other words, in the examples of FIGS. 9A and 9B, each of them is arranged in the front direction.

The stream control board 17 is an example to which the stream control mechanism according to the present disclosure is applied and is arranged in the processing fluid bath 6 to suppress the stream of the processing fluid supplied from the processing fluid supply port 701 (the processing fluid supply mechanism) to the processing fluid bath 6 in the direction of the water surface of the processing fluid in the processing fluid bath 6.

As illustrated in FIG. 9B, the stream control board 17 is provided at the upper portion in the vertical direction of the processing fluid supply port 701 between the wire 7 and the processing fluid supply port 701.

The stream control board 17 allows reducing the jet flow of the processing fluid in the processing fluid bath 6 in the direction of the water surface and controlling the stream of the processing fluid supplied from the processing fluid supply port 701 (the processing fluid supply mechanism).

The stream control board 17 is provided between the wire 7 and the processing fluid supply port 701 (the processing fluid supply mechanism) and arranged in a position where the processing fluid supplied from the processing fluid supply port 701 to the processing fluid bath 6 detours the stream control board in the processing fluid bath 6 and flows in the direction of the water surface of the processing fluid in the processing fluid bath 6.

The processing fluid supply port 701 is provided communicating with the processing fluid bath 6, at the lower portion in the vertical direction of the wire 7 traveling in the vicinity of the water surface of the processing fluid in the processing fluid bath 6 (in the processing fluid in the processing fluid bath 6), and the stream control board 17 is a board provided between the wire 7 and the processing fluid supply port 701.

The stream control board 17 is a board whose length is determined according to the width of a plurality of the wires 7 and the length of the board is equal to or longer than the width thereof.

Figure 10A:
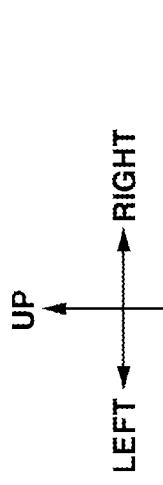
FIGS. 10A and 10B illustrate an example of the flow of the processing fluid in the processing fluid bath due to the supply of the processing fluid from the processing fluid supply port to the dielectric fluid bath equipped with the flux dispersion control mechanism.
Figure 10B:
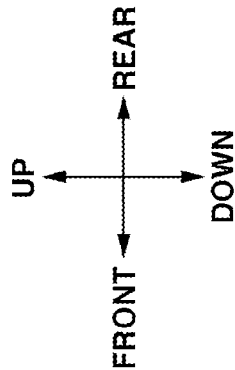

The processing fluid bath 6 according to the present exemplary embodiment is provided not only with the stream control board 17 illustrated in FIGS. 9A and 9B but with a flux dispersion control mechanism 801 illustrated in FIGS. 10A and 10B.

The flux dispersion control mechanism 801 illustrated FIGS. 10A and 10B is an example to which the dispersion mechanism according to the present disclosure is applied. The stream control mechanism according to the present disclosure includes the flux dispersion control mechanism 801 illustrated in FIGS. 10A and 10B.

The flux dispersion control mechanism 801 illustrated in FIGS. 10A and 10B is a mechanism that is provided in the processing fluid supply port 701 and disperses the stream of the processing fluid supplied from the processing fluid supply port 701 to the processing fluid bath 6.

The flux dispersion control mechanism 801 provided in the processing fluid bath 6 is described below with reference to FIGS. 10A and 10B.

The following describes, with reference to FIGS. 10A and 10B, the flow of the processing fluid in the processing fluid bath 6 due to the supply of the processing fluid from the processing fluid supply port 701 to the processing fluid bath 6 equipped with the flux dispersion control mechanism 801.

FIGS. 10A and 10B illustrate the flow of the processing fluid in the processing fluid bath 6 due to the supply of the processing fluid from the processing fluid supply port 701 to the processing fluid bath 6 equipped with the flux dispersion control mechanism 801.

Arrows in the processing fluid bath 6 illustrated in FIGS. 10A and 10B indicate the flow of the processing fluid in the processing fluid bath 6 due to the supply of the processing fluid.

As illustrated in FIGS. 10A and 10B, the flux dispersion control mechanism 801 is arranged in the vicinity of the bottom of the processing fluid bath 6 to isolate the processing fluid supply port 701 from the wire stretching portion (the wire 7), causing the stream to reach the water surface with flow rate reduced without directly welling up in the direction of the water surface where a plurality of the wires 7 are stretched from the bottom of the processing fluid bath 6, which reduces disordering the distance between the wires stretched at equally spaced intervals to allow more stable electrical discharge machining.

FIGS. 10A and 10B illustrate the same processing fluid bath 6 but are different from each other in the direction from which the processing fluid bath 6 is viewed. FIG. 10A is a diagram viewed from the front. FIG. 10B is a diagram viewed from the right.

As illustrated in FIGS. 10A and 10B, the processing fluid supplied from the processing fluid supply port 701 is supplied to the flux dispersion control mechanism 801 and supplied from the flux dispersion control mechanism 801 to the processing fluid bath 6.

As illustrated in FIGS. 10A and 10B, the processing fluid is supplied from the processing fluid supply port 701 on the left and right sides to the flux dispersion control mechanism 801.

The flux dispersion control mechanism 801 is made of a sponge 803 being a porous material.

The processing fluid supplied from the processing fluid supply port 701 to the processing fluid bath 6 passes through the sponge 803 being a porous material and is supplied to the processing fluid bath 6 with a large number of pores of the sponge 803 dispersing the stream of the processing fluid, which weakens the stream to allow inhibiting the wire from being vibrated due to the jet flow of the processing fluid.

As described above, the wire can be inhibited from being vibrated due to the jet flow of the processing fluid supplied from the processing fluid supply mechanism in the processing fluid bath 6.

According to the present disclosure, the amount of the processing fluid required for the electrical discharge machining is ensured in the electrical discharge machining portion (the electrical discharge gap) to allow the workpiece to be appropriately machined by the electrical discharge.

The work in which the workpiece is subjected to the electrical discharge machining by means of the wire electrical discharge machining method described in the present exemplary embodiment is also a characteristic of the present disclosure.

According to the present disclosure, the vibration of the wire due to the jet flow of the processing fluid supplied from the processing fluid supply port in the processing fluid bath can be reduced to allow the workpiece to be appropriately machined by the electrical discharge.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-138881 filed Jun. 20, 2013, which is hereby incorporated by reference herein in its entirety.

What is claimed is:

1. A multi-wire electrical discharge machining apparatus for machining a workpiece set directly above a group of wires arranged side by side by moving the workpiece downward in a vertical direction and performing electrical discharge between a group of wires and the workpiece, the apparatus comprising:

a roller configured to allow the group of wires to travel; and a processing fluid bath including a processing fluid supply port to which processing fluid used for electrical discharge machining performed between the workpiece and the group of the wires is supplied from a processing fluid supply apparatus and configured to store the processing fluid supplied from the processing fluid supply port, wherein the processing fluid bath further includes a stream control mechanism provided at a position, which is located between the group of wires caused, by the roller, to travel in a direction intersecting a vertical direction of the processing fluid supply bath and the processing fluid supply port provided at a position lower than the travelling group of wires in the vertical direction, is located directly below the workpiece and the group of wires, and is located higher than the processing fluid supply port in the vertical direction, and configured to suppress a stream of the processing fluid supplied from the processing fluid supply port, which flows in a direction toward the group of wires from a portion directly therebelow.

2. The multi-wire electrical discharge machining apparatus according to claim 1, wherein the stream control mechanism is provided in a position where the stream control mechanism suppresses the stream that flows in the direction toward the group of wires as a result of the processing fluid, which is supplied from the processing fluid supply port to the processing fluid bath, detouring the stream control mechanism in the processing fluid bath.

3. The multi-wire electrical discharge machining apparatus according to claim 1, wherein the processing fluid supply port is provided communicating with the processing fluid bath, at a lower portion in the vertical direction of the group of wires traveling in a vicinity of a water surface of the processing fluid in the processing fluid bath, and wherein the stream control mechanism is a board provided between the group of wires and the processing fluid supply port.

4. The multi-wire electrical discharge machining apparatus according to claim 1, wherein the stream control mechanism is a board having a length equal to or longer than a width of the group of wires including a plurality of wires.

5. The multi-wire electrical discharge machining apparatus according to claim 1, wherein the stream control mechanism further includes an adjustment unit configured to adjust the length of the board according to a number of wires included in the group of wires.

6. The multi-wire electrical discharge machining apparatus according to claim 1, wherein the stream control mechanism further includes a dispersion mechanism provided in the processing fluid supply port in such a manner as to occlude the processing fluid supply port and configured to disperse the stream of the processing fluid supplied from the processing fluid supply port into the processing fluid bath.

7. The multi-wire electrical discharge machining apparatus according to claim 6, wherein the dispersion mechanism is made of a porous material.

8. The multi-wire electrical discharge machining apparatus according to claim 6, wherein the dispersion mechanism is made of a sponge.

9. A method of wire electrical discharge machining using a multi-wire electrical discharge machining apparatus for machining a workpiece set directly above a group of wires arranged side by side by moving the workpiece downward in a vertical direction and performing electrical discharge between a group of wires and the workpiece, the method comprising:

allowing the group of wires to travel; and storing a processing fluid supplied from a processing fluid supply port in a processing fluid bath to which processing fluid used for electrical discharge machining performed between the workpiece and the group of wires is supplied, wherein the processing fluid bath includes a stream control mechanism provided at a position, which is located between the group of wires to travel in a direction intersecting a vertical direction of the processing fluid supply bath and the processing fluid supply port provided at a position lower than the travelling group of wires in the vertical direction, is located directly below the workpiece and the group of wires, and is located higher than the processing fluid supply port in the vertical direction, and configured to suppress a stream of the processing fluid supplied from the processing fluid supply port, which flows in a direction toward the group of wires from a portion directly therebelow.

10. The method according to claim 9, wherein the stream control mechanism is provided in a position where the stream control mechanism suppresses the stream that flows in the direction toward the group of wires as a result of the processing fluid, which is supplied from the processing fluid supply port to the processing fluid bath, detouring the stream control mechanism in the processing fluid bath.

11. The method according to claim 9, wherein the processing fluid supply port is provided communicating with the processing fluid bath, at a lower portion in the vertical direction of the group of wires traveling in a vicinity of a water surface of the processing fluid in the processing fluid bath, and wherein the stream control mechanism is a board provided between the group of wires and the processing fluid supply port.

12. The method according to claim 9, wherein the stream control mechanism is a board having a length equal to or longer than a width of the group of wires including a plurality of wires.

13. The method according to claim 9, wherein the stream control mechanism includes adjusting the length of the board according to a number of wires included in the group of wires.

14. The method according to claim 9, wherein the stream control mechanism includes a dispersion mechanism provided in the processing fluid supply port in such a manner as to occlude the processing fluid supply port and configured to disperse the stream of the processing fluid supplied from the processing fluid supply port into the processing fluid bath.

* * * * *